United States Patent [19]

Lesiecki et al.

[11] Patent Number: 4,502,693
[45] Date of Patent: Mar. 5, 1985

[54] BUSHING SEAL WITH DUAL RESTRICTED FLUID PASSAGES

[75] Inventors: Gerald Lesiecki, Greendale; Kenneth E. Kraemer, Brookfield, both of Wis.

[73] Assignee: Allis-Chalmers Corporation, Milwaukee, Wis.

[21] Appl. No.: 632,309

[22] Filed: Jul. 19, 1984

[51] Int. Cl.³ .......................... F16J 15/40; F16J 15/50
[52] U.S. Cl. .......................................... 277/3; 277/15; 277/17; 277/133; 277/135; 277/173; 277/DIG. 8
[58] Field of Search .................. 277/3, 15-21, 277/28, 29, 133-135, 173, 176, DIG. 8

[56] References Cited

U.S. PATENT DOCUMENTS

| 2,835,514 | 5/1958 | McJahan | 277/3 |
| 3,081,095 | 3/1963 | Hamrick | 277/3 X |
| 3,580,587 | 5/1971 | Hessheim et al. | 277/3 |
| 3,724,861 | 4/1973 | Lesiecki | 277/135 X |
| 4,146,238 | 3/1979 | Jaffal | 277/15 |
| 4,466,619 | 8/1984 | Adams | 277/15 |

FOREIGN PATENT DOCUMENTS 245821 1/1926 United Kingdom ................ 277/134

Primary Examiner—Robert S. Ward
Attorney, Agent, or Firm—Timothy R. Conrad

[57] ABSTRACT

A bushing seal for a compressor for compressing wet chlorine. The bushing seal includes a bushing surrounding a rotary member of the compressor. Opposing surfaces of the shaft and the bushing define a first restricted fluid passage in communication with the interior of the compressor. Opposing surfaces of the bushing and a compressor casing define a second restricted fluid passage in communication with the interior of the compressor. Opposing surfaces of the rotary member and the bushing define a pumping chamber for receiving a sealing fluid having an initial pressure in excess of a pressure of a process gas within the compressor when the compressor is not operating. The pumping chamber increases the pressure of the sealing fluid to a pressure in excess of a pressure of the process gas when the compressor operates. The outlet of the pumping chamber is in fluid flow communication with the first and second restricted fluid passages.

10 Claims, 2 Drawing Figures

BUSHING SEAL WITH DUAL RESTRICTED FLUID PASSAGES

BACKGROUND OF THE INVENTION

1. Field of the Invention

This invention relates to a bushing seal for a rotary member such as a centrifugal compressor. More particularly, this invention relates to a bushing seal with means for keeping the bushing surfaces wet wherever a process gas may come in contact with the bushing surfaces.

2. Description of the Prior Art

The present invention has particular adaptation for compressors for wet chlorine gas. In the production of chlorine, chlorine gas is generated on electrolytic cells. Where chlorine gas is collected, it is near atmospheric pressure. The collected chlorine gas is saturated with water and has an elevated temperature. Before the chlorine gas is compressed, the gas from the electrolytic cells is passed through a heat exchanger and moisture separator. Historically, the apparatus for heat exchange and moisture separation was the process capacity limit related to the volume of the chlorine gas passed through the equipment. With the advent of compressing the chlorine gas prior to passing it through the heat exchanger and moisture separator, the wet chlorine gas presented numerous problems relative to corrosion to metals commonly used in the manufacture of the compressors and its seals. One metal which resists the corrosive tendencies of wet chlorine gas is titanium.

Titanium, while resistant to corrosion from wet chlorine, is highly reactive with dry chlorine. If chlorine was to contact dry titanium, the chlorine and titanium react violently in an exothermic reaction until either the chlorine or the titanium is completely consumed by the reaction. Due to this reaction between titanium and dry chlorine, a special effort was made to keep the many titanium parts of the compressor and rotary shaft seal wet. Accordingly, prior art compressors for chlorine gas used carbon ring seals which were steam buffered. A disadvantage of carbon ring seals is that they wear and require frequent maintenance because it is impossible to keep their many parts wet. While, it would be desirable to have a long wearing seal such as a pumping buffered bushing seal as disclosed in commonly assigned U.S. Pat. No. 3,724,861, such a seal has too low an inner leakage and, with chlorine having a high affinity with water, could result in chlorine escaping to the atmosphere.

OBJECTS AND SUMMARY OF THE INVENTION

It is an object of the present invention to provide a seal for a rotary shaft with means for keeping all primary and secondary surfaces of the sealing members wet with a sealant fluid.

It is a further object of the present invention to provide a bushing seal for a rotary compressor with means for keeping the surfaces of the bushing seal wet.

It is yet a further object of the present invention to provide a bushing seal for a rotary shaft with a sealing fluid supplied to the bushing at a pressure sufficient to stop process gases when the shaft is not rotating and with pumping means provided to increase the pressure of the sealing fluid to stop the flow of process gases when the shaft is rotating.

According to a preferred embodiment of the present invention, a bushing seal is provided for a rotary shaft of a centrifugal compressor. Opposing surfaces of the bushing and shaft define a first restricted annular passage in communication with the process gas contained within the compressor. Likewise, opposing surfaces of the bushing and a stationary housing define a second restricted fluid passage which is in communication with the process gas. A fluid inlet is provided through the housing in communication with the first restricted passage. Means are provided for admitting a sealing fluid, such as water, through the inlet at a pressure sufficient to block the flow of process gases when the shaft is not rotating. Pumping means, comprising a pumping chamber defined between rotary and stationary members, is provided intermediate the first restricted passage and the process gas for increasing the pressure of a portion of the sealing fluid admitted to the first restricted passage. The pumping means increases the pressure of the portion of the sealing fluid to a pressure sufficient to block the flow of increased processed gas pressure from the pumping of the gas impeller resulting from the rotational speed of the shaft. A fluid passage connects the pumping chamber with the second restricted passage in fluid flow communication. When a sealing fluid is admitted under pressure to the inlet, the pumping chamber increases the pressure of the sealing fluid above that of the process gas with the sealing fluid distributed through the passages to cover the surfaces of the bushing seal with the sealing fluid, thereby preventing the surfaces of the bushing seal from becoming dry.

It will be apparent to those skilled in the art that the invention has an added advantage in that it provides both primary and secondary sealing without the use of O-rings or the like customarily used as secondary seals.

DESCRIPTION OF THE PREFERRED EMBODIMENT

Figure 1:
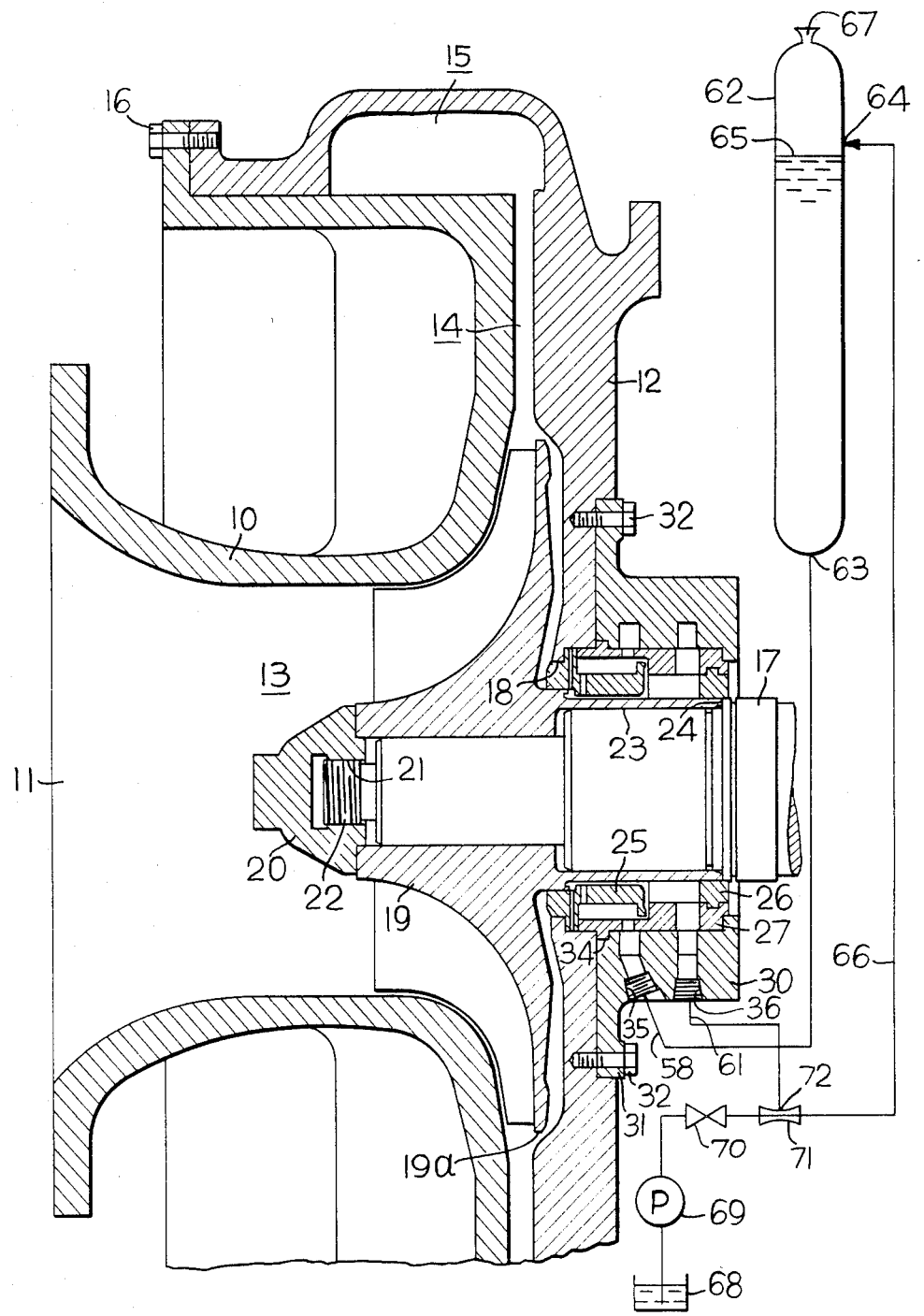
FIG. 1 is a cross-sectional view of a single stage centrifugal compressor with a bushing seal according to the present invention together with a schematic representation of a system for admitting sealing fluid to the bushing seal.

Referring to FIG. 1, a centrifugal compressor is shown for compressing wet chlorine gas. The compressor comprises an inlet cone 10 having an inlet opening 11 and a compressor casing 12 which cooperates with opposing surfaces of the cone 10 to define the interior of the compressor 13, the compressor diffuser 14, and the compressor volute 15. The casing 12 is secured to the inlet cone 10 by means of bolts, such as at 16.

A rotary shaft 17 extends through an opening 18 in the casing 12. An impeller 19 is provided within the interior 13 of the compressor and is rigidly connected to the shaft 17 in any conventional manner for rotation therewith. As shown in FIG. 1, the impeller 19 is secured to the shaft 17 by means of a hub cap 20 having a threaded interior bore 21 which is received on an axially extending threaded hub 22 of the shaft 17. The hub cap 20 is turned urging an impeller collar 23 against a locating shoulder 24 of the shaft 17.

A bushing seal is provided for preventing process gas within the compressor interior 13 from escaping past the shaft 17 to the atmosphere. The seal includes a stepped bushing 25 which surrounds the collar 23 adjacent the impeller 19. A baffle 26 surrounds the collar 23 and is axially disposed away from the bushing 25 on a side of the bushing 25 away from the impeller 19. A seal inner liner 27 comprising a cylindrical body with a plurality of radially extending holes (as will be more fully described later) surrounds both the bushing 25 and baffle 26 with an inner-radial notch 28 of the inner liner receiving a corresponding sized outer radial ring 29 of the baffle 26 with the inner liner 27 thereby abating axial movement of the baffle 26 relative to the inner liner 27. A seal housing 30 surrounds the seal inner liner with an axial flange 31 of the seal housing 30 abutting the casing 12 and is secured to the casing 12 by means of bolts 32. An inner radial notch 33 of the housing 30 receives a sized outer radial ring 34 of the inner liner 27 thereby abating relative axial movement of the housing 30 and inner liner 27. A sealing fluid inlet port 35 is provided through the housing 30 for admitting a sealing fluid to the bushing 25. Likewise, a sealing fluid outlet port 36 is provided through the seal housing 30 for evacuating a sealing fluid.

In a preferred embodiment, the centrifugal compressor as shown in FIG. 1 is for compressing wet chlorine gas. In such an embodiment, the metal from which the bushing 25 is formed is preferably titanium and the sealing fluid is preferably water. While the above is the preferred embodiment of the present invention, it will be appreciated that the bushing seal of the present invention may be used to seal a wide variety of rotating shafts for a wide variety of applications. Likewise, while water is disclosed as being the preferred sealing fluid, and while the process fluid is referred to as a gas, it will be understood that the invention disclosed may be used in other applications. However, it will be preferred that the sealing fluid have a greater density than the process fluid.

Figure 2:
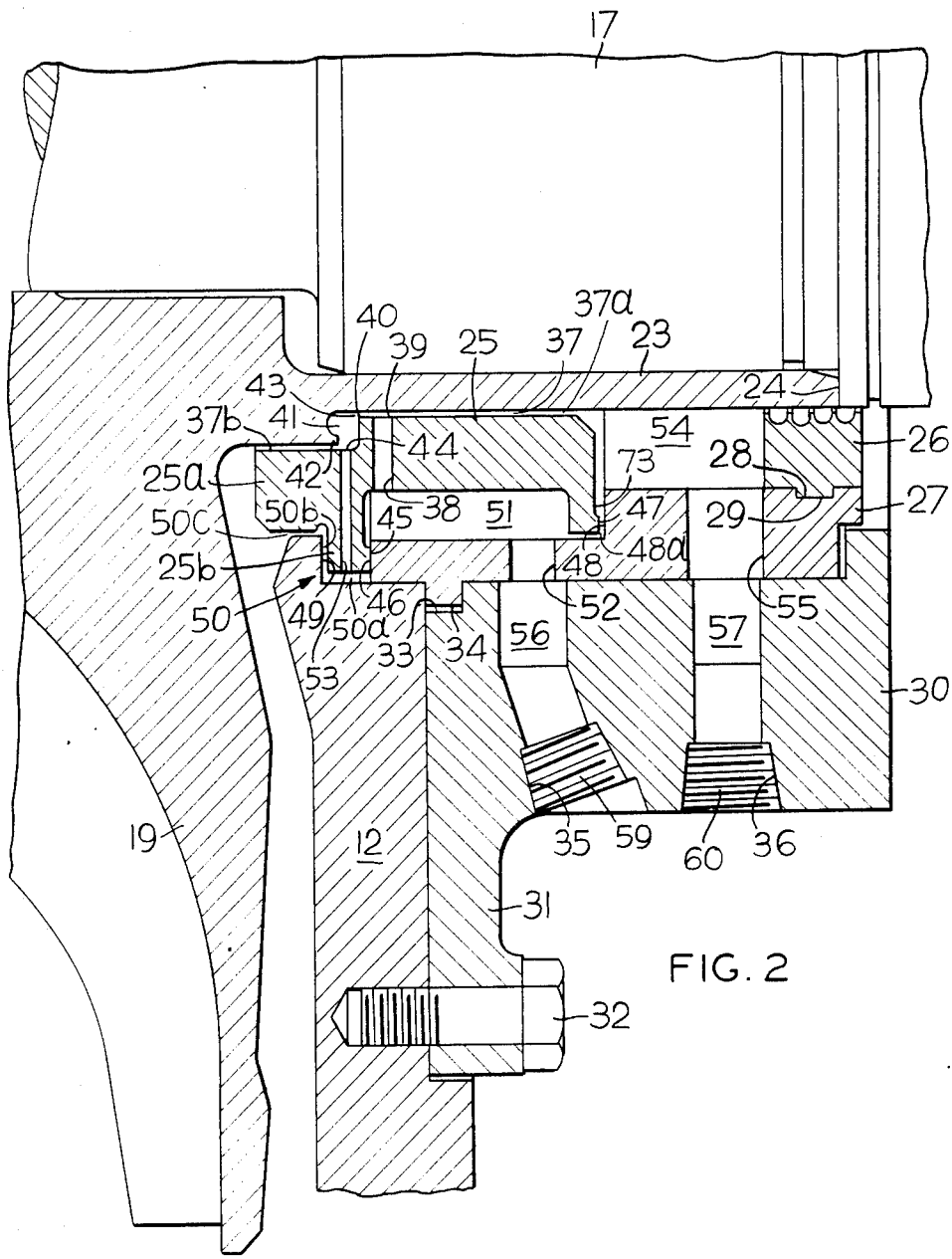
FIG. 2 is an enlarged portion of FIG. 1 showing details of the bushing seal of the present invention.

In FIG. 2, the bushing seal of the present invention is shown in greater detail. In FIG. 2, the stepped bushing 25 is positioned about the impeller collar 23 in radial clearance therewith. The stepped bushing 25 is constructed as a separate element as shown herein so that it will float with the shaft 17 and impeller 19. Opposing surfaces of the bushing 25 and the impeller 19 and collar 23 define an annular restrictive fluid passage 37 extending the length of the bushing 25 and in communication with the interior of the compressor. The step 25a of the bushing separates the passage 37 into a low pressure passage 37a defined between the collar 23 and the bushing 25 and a high pressure passage 37b defined between the step 25a and the impeller 19.

The bushing 25 is provided with a plurality of radially extending inlet passages 38 extending through the bushing in communication with an annular inlet chamber 39 formed along the radially inner surface of the bushing 25. An annular ridge 40 on the interior surface of the stepped bushing 25 forms one wall of the inlet chamber 39 and also one wall of a pumping chamber 41. The pumping chamber 41 is defined by the ridge 40 and the stepped bushing 25 and a shoulder 42 on the impeller 19. An interior annular edge of the ridge 40 defines an annular restricted inlet port 43 connecting the inlet chamber 39 with the pumping chamber 41. Since this port 43 has a much smaller axial surface than the low pressure restricted flow passage 37a, it offers less resistance to liquid flow than the restricted fluid passage 37a. An oulet 44 of the pumping chamber is connected in fluid flow communication with the high pressure restricted fluid flow passage 37b.

As shown in FIG. 2, the bushing 25 is restrained from axial movement by means of the seal inner liner 27. A portion 25b of the bushing extending radially from the pumping chamber 41 is provided with a radial face 45 opposing and abutting a radial surface 46 of the seal inner liner. A second radial surface 47 of the bushing 25 opposes a second radial surface 48 of the seal inner liner 27 in close tolerance without the surfaces 47 and 48 touching to define a radial gap 48a.

As is shown in FIG. 2, the casing 12 is provided with inwardly projecting radial surface 49 opposing the radially projecting portion 25b of the bushing 25 in close tolerance without contact. As a result, the bushing 25 and the stationary casing 12 cooperate to define a second restricted fluid passage 50 in communication with the interior of the compressor with the restricted fluid passage 50 comprising a first axial gap 50a, a radial gap 50b having a thickness less than the first axial gap 50a and second axial gap 50c. Opposing axial surfaces of the bushing 25 and the seal inner liner 27 define a first annulus 51 surrounding the outer axial surface of the bushing seal and in communication with both the inlet passage 38 and a first set of radial holes 52 formed within the seal inner liner 27.

The bushing 25 is provided with a plurality of fluid passages 53 extending radially through the bushing 25 and having a first end in communication with the oulet 44 of the pumping chamber 41 and a second end in communication with the first axial chamber 50a portion defined between the bushing 25 and the casing 12.

Opposing surfaces of the impeller collar 23, bushing 25, seal inner liner 27 and the baffle 26 define a second annulus 54 surrounding the impeller collar 23 and in fluid flow communication with both the low pressure restrictive fluid passage 37a and a second set of holes 55 formed within the seal inner liner 27.

As shown in FIGS. 1 and 2, the seal housing 30 is provided with a first annulus 56 on an inner radial portion of the seal housing 30 in communication with the first set of radial holes 52 formed within the seal inner liner 27. Likewise, a second annulus 57 is formed within the seal housing 30 in communication with the second set of radial holes 55 formed within the seal inner liner 27. A sealant inlet port 35 is provided within the seal housing in communication with the first annulus 56. The inlet port 35 is provided with threads 59 to receive a male threaded fluid inlet pipe (schematically shown as 58 in FIG. 1). Likewise, an outlet port 36 is formed within the seal housing 30 in communication with the second annulus 57. The outlet port 36 is provided with threads 60 for receiving a male threaded plug of a discharge pipe (61 in FIG. 1).

Referring to FIG. 1, a sealant head tank 62 is provided vertically disposed above the compressor with an outlet 63 on the bottom of the supply tank 62 connected to the inlet pipe 58. The head tank 62 has an inlet 64 above a predetermined desired water level 65 (as will be described) with the inlet 64 connected to a supply pipe 66. An upper portion of the tank 62 has an opening 67 permitting communication of the tank interior with atmospheric air. A source of sealing fluid is schematically shown at 68. A pump 69 is provided for forcing the sealant through the supply pipe 66. A control valve 70 is disposed on the supply pipe 66 to control the flow of the sealing fluid through the pipe 66. A venturi-type jet pump 71 is shown disposed along the supply pipe 66 with its suction portion 72 connected to the discharge port 36 by means of the discharge pipe 61.

In operation of the compressor, chlorine which is saturated with water is collected at the inlet 11 of the compressor and compressed by means of the rotating impeller 19. At the inlet 11, the chlorine is of near atmospheric pressure. By reason of the action of the impeller 19, the chlorine at an outside diameter 19a of the impeller 19 enters the diffuser 14 at an increased pressure. For example, the pressure of the chlorine may be doubled. The head tank 62 is supplied with a sealing fluid, preferably water, for the fluid to attain a predetermined level 65 within the tank 62 such that the sealing fluid is supplied through the pipe 58 at a predetermined desired head. The predetermined desired head is for a pressure of a sealing fluid supplied to the inlet chamber 39 to be higher than the pressure of the chlorine at the outside diameter 19a of the impeller 19 when the impeller is not rotating. For the preferred example where chlorine is collected within the compressor at near atmospheric pressures, I have determined that the head tank 62 should be filled with water to provide a head of about ten feet which is more than enough to overcome any friction losses within the inlet pipe 58 and in the bushing seal.

Sealing fluid from the supply tank 62 flows through the inlet pipe 58 into the inlet port 35 and is distributed within the first annulus 56. The sealing fluid flows from the first annulus 56 through the plurality of radially extending first holes 52 into the annulus 51 defined between the bushing 25 and the seal inner liner 27. The sealing fluid within the annulus 51 is divided into a first portion flow which flows through the radially extending inlet passages 38 into the inlet chamber 39. The remainder of the flow into the annulus 51 escapes into the second annulus 54 by means of flowing through the radial gap 48a defined between the bushing 25 and the seal inner liner 27.

The sealing fluid which flows into the inlet chamber 39 is divided with a portion of the flow passing through the low pressure restricted fluid passage 37a into the second annulus 54. The remainder of the flow passes through the port 43 into the pumping chamber 41. Flow from the pumping chamber is further divided into two additional portions. The first portion takes a path through the high pressure restricted fluid passage 37b into the interior of the compressor. The remaining portion from the pumping chamber 41 passes through the radial passages 53 into the first axial chamber 50a from which the sealing fluid flows through the radial chamber 50b and second axial chamber 50c into the interior of the compressor. In this manner, the second restricted fluid passage 50 acts as a secondary seal eliminating the need for O-rings which are commonly used as secondary seals.

When the compressor impeller 19 and shaft 17 are not rotating, the sealing fluid is supplied to the inlet chamber 39 at a pressure higher than the pressure of the chlorine at the impeller's outside diameter 19a. Accordingly, the sealing fluid flows between the surfaces of the bushing 25 and impeller 19 and between the surfaces of the bushing 25 and casing 12. Therefore, bushing surfaces which might otherwise come in contact with the chlorine are kept wet with sealing fluid at all times.

The pressure of the sealing fluid supplied to the inlet chamber 39 is kept constant keeping the level 65 of water within the head tank 62 constant. This may be achieved by a level control (not shown) which would modulate the control valve 70 permitting a flow of water through the supply pipe 66 into the tank to replenish the water within the tank 62. As sealing fluid flows through the supply pipe 66, a suction occurs within the venturi-type jet pump 71. This suction connected by means of the discharge pipe 61 to the discharge port 36 results in subatmospheric pressure within the second annulus 54. As a result, the flow from the low pressure restricted flow passage 37a and the flow from the radial gap 48a is drawn from the second annulus 54 into the discharge port 36 and mixed with the fluid flow passing through supply pipe 66 into the tank. The subatmospheric pressure within the second annulus 54 also causes atmospheric air to flow across the restricted passages defined between the impeller collar 23 and the baffle 26 thereby preventing diffusion of the sealing fluid across the baffle 26 into the atmosphere. Air entrained within the fluid flowing through discharge pipe 61 and back into the head tank 62 is permitted to be evacuated through the outlet 67 at the top of the head tank 62.

As can be determined from the foregoing, the only sealing fluid which is lost is the sealing fluid that flows between the surfaces of the bushing 25 and the impeller 19 and the surfaces of the bushing 25 and the casing 12 into the interior of the compressor. Therefore, the flow of sealing fluid from the supply 68 need only equal the flow of sealing fluid lost in the compressor.

The amount of sealing fluid which must be made up by the supply 68 to the secondary seals is a function of clearance. Secondary seals are established by maintaining the radial gap 48a between the bushing 25 and the seal inner liner 27 to be as small as possible without the seal inner liner 27 and the bushing touching. As indicated at 73, the bushing 25 is stepped back from the point of nearest proximity of the bushing 25 and the seal inner liner 27 to provide ease of machining of the bushing to tight tolerances. Likewise, leakage can be controlled by providing as small a radial gap 50b as possible between the opposing surfaces of the bushing 25 and casing 12. It is important to note that the clearance should not be so small as to block flow since this would defeat the purpose of keeping the surfaces of the bushing wet. Radial surfaces of the bushing 25 exposed to fluid pressure are sized to have areas such that there is a high enough pressure imbalance across the bushing urging the bushing load face 45 against the seal inner liner 27 to prevent axial movement of the bushing but low enough so the bushing will not float with the shaft during operation near concentricity. Determining the appropriate areas of the radial surfaces to accomplish a desired face loading of the bushing against the seal inner liner is well known in the art.

When the shaft 17 and impeller 19 rotate, the pressure of the chlorine in the compressor is increased. At a given rotational speed of the impeller 19 and the shaft 17, the pressure at the outside diameter 19a of the impeller will exceed the pressure of the sealing fluid attributable to the head of water maintained within the tank 62. To prevent the chlorine from entering the high pressure fluid passage 37b and the second fluid passage 50, the pumping chamber 41 increases the pressure of the sealing fluid. The pumping chamber 41 is a viscous pump which is designed so that its head is greater than the head of the compressor measured at the outside diameter 19a of the impeller 19. As is known to those skilled in the art, the head of a viscous pump is a function of its differential radius, the density of the pumped fluid, and the velocity of the rotating elements of the viscous pump. Preferably, the viscous pump is designed such that when the impeller 19 is rotating, the pressure of the sealing fluid at the outlet 44 of the pump 41 exceeds the pressure of the wet chlorine at the outside diameter 19a of the impeller 19 by a predetermined nominal amount. For example, the viscous pump can be designed to have the pressure of the sealing fluid at the outlet 44 of the viscous pump 41 be approximately twenty percent higher than the pressure of the chlorine at the outside diameter 19a in the impeller 19. With the pressure of the sealing fluid thus increased by the viscous pump 41, the sealing fluid prevents the flow of the chlorine. The sealing fluid now flows through the high pressure restricted fluid passage 37b and through the radial holes 53 into and through the secondary high pressure fluid passage 50 whereby all surfaces of the bushing which might otherwise come in contact with chlorine are wetted by the sealing fluid.

As can be seen from the foregoing, the surfaces of the bushing 25 which might otherwise come in contact with the chlorine are kept wet at all times. As the velocity of the impeller 19 and shaft 17 increases with a corresponding increase in the pressure of the chlorine within the compressor, the pump chamber 41 automatically increases the pressure of the sealing fluid to insure that the sealing fluid will flow through restricted passages and keep the bushing surfaces wet. Accordingly, at all times the titanium bushing is kept wet, thereby preventing the dangerous circumstances of chlorine contacting dry titanium.

As make-up water is flowing through the supply pipe 66 to the tank 62 and through the venturi-type jet pump 72, suction on the discharge port 36 maintains subatmospheric pressure within the second annulus 54 which draws air through the surfaces between the baffle 26 and the impeller 19. As a result, diffusion of the sealing fluid into the atmosphere is avoided.

From the foregoing detailed description of the present invention, it has been shown how the objects of the invention have been attained in a preferred manner. However, modifications and equivalents of the disclosed concepts, such as readily occur to those skilled in the art, are intended to be included in the scope of this invention. Thus, the scope of the invention is intended to be limited only by the scope of the claims as are, or may hereafter be, appended hereto.

The embodiments of the present invention in which an exclusive property or privilege is claimed are defined as follows:

1. In combination with a housing surrounding a rotary member extending from a first fluid area to a second fluid area;
    sealing means for blocking flow of a process fluid from said first area to said second area;
    said sealing means and said rotating member having opposing surfaces defining a first restricted fluid passage in fluid flow communication with said first fluid area;
    said sealing means and said housing having opposing surfaces defining a second restricted fluid passage in fluid flow communication with said first fluid area;
    means for admitting a flow of a sealing fluid to said first restricted passage at a pressure higher than a pressure of said process fluid when said member is not rotating;
    pumping means for increasing the pressure of at least a portion of said sealing fluid within said first restricted passage to a pressure in excess of the pressure of said process fluid when said member rotates; and
    means for admitting at least a portion of said increased pressure portion of said sealing fluid to said second restricted passage.

2. In the combination according to claim 1, wherein said process fluid in said first area has a pressure varying as a function of a rotational speed of said rotary member;
    said pumping means is provided responsive to said rotational speed to vary the pressure of said portion of said sealing fluid with said portion having a pressure exceeding a pressure of said process fluid as said rotary member rotates at any speed.

3. In the combination according to claim 2, said sealing means comprises a bushing surrounding said rotary member with opposing surfaces of said bushing and rotary member defining said first restricted passage and opposing surfaces of said bushing and housing defining said second restricted passage;
    said pumping means is provided within said first fluid passage separating said first fluid passage into a low pressure portion on a side of said pumping means remote from said first area and a high pressure portion on a side of said pump adjacent said first area;
    said pumping means is provided with an inlet in communication with said low pressure portion and an outlet in communication with said high pressure portion;
    means for providing fluid flow communication between said outlet and said second restricted passage.

4. In the combination according to claim 3, said pumping means comprises a viscous pump defined by opposing surfaces of said bushing and said rotary member.

5. In the combination according to claim 4, wherein said means for providing fluid communication between said outlet and said second restricted passage comprises a plurality of fluid passages formed within said bushing and having one end in fluid flow communication with said outlet of said pump and a second end in fluid flow communication with said second restricted passage.

6. In the combination according to claim 5, wherein said bushing is provided with a fluid inlet passage extending therethrough in fluid flow communication with said low pressure portion adjacent said pump inlet;
    means for connecting said inlet with a source of sealing fluid having a pressure higher than a pressure of said process fluid when said rotary member is not rotating.

7. In the combination according to claim 6, means for providing a suction on said low pressure portion.

8. In the combination according to claim 7, wherein said sealing fluid is a liquid with means for admitting said liquid to said inlet passage at a generally constant pressure;
    said means comprising a container having an outlet in fluid flow communication with said inlet passage;
    means for maintaining liquid within said container at a predetermined head.

9. In the combination according to claim 8, liquid supply means for supplying a flow of liquid to said container;

valve means for regulating said flow to approximately equal a rate at which sealing fluid flows into said first area;

a jet pump operably connected to said supply means and having a suction portion in fluid flow communication with said low pressure portion.

10. In the combination according to claim 6, wherein said rotary member comprises a shaft for a compressor; said process fluid comprises chlorine gas; said bushing is formed at least in part from titanium; and said sealing fluid comprises water.

* * * * *